Sept. 13, 1932.    W. R. UHLEMANN    1,877,089
LENS MOUNT
Filed June 4, 1930
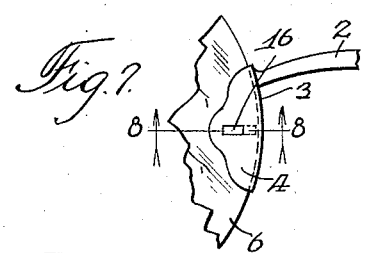
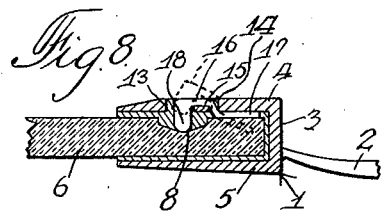
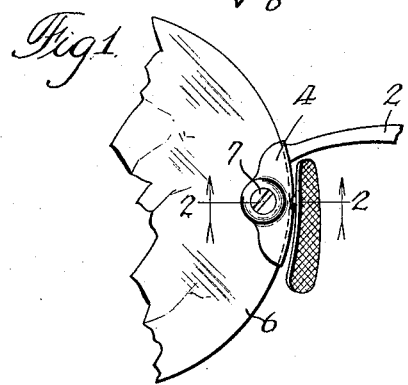
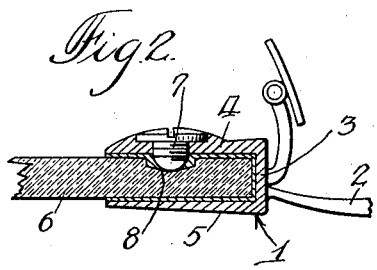
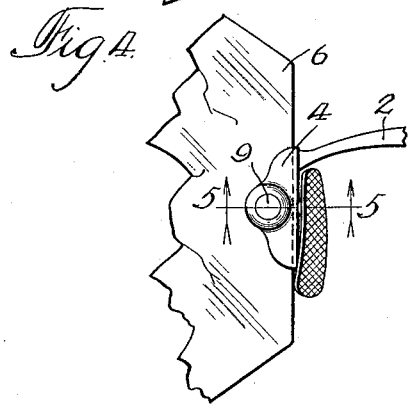
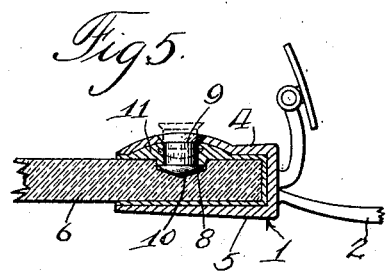
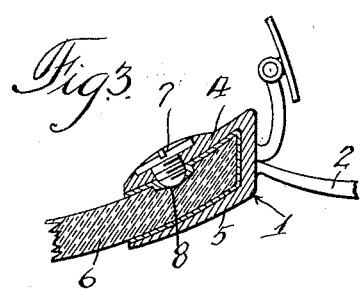
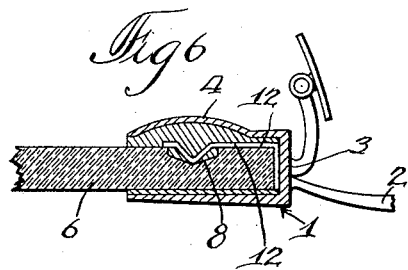
Inventor:
William R. Uhlemann
Witness
David S. Magnusson Patented Sept. 13, 1932

1,877,089

UNITED STATES PATENT OFFICE

WILLIAM R. UHLEMANN, OF EVANSTON, ILLINOIS

LENS-MOUNT

Application filed June 4, 1930. Serial No. 459,209.

My invention relates to lens mounts and more particularly to means and method for securing the rimless lenses of eye glasses to suitable bridge or temple member.

Heretofore it has been difficult to securely mount the lens in such a manner that they would not become loose or be easily broken adjacent the mounting means. In my invention, I have provided a simple and convenient means for securely mounting without materially weakening the lens, and have also provided a simple and efficient locking means for securing the supporting strap or yoke firmly on the lens.

I have also provided a device which is cheap to manufacture, easy to assemble, and rigidly held in place and in which any strain imposed thereon will be evenly distributed and not concentrated at any one point on the lens.

A further desirable feature is a means and method of mounting whereby the lens is secured firmly in place without applying pressure thereto, and without drilling or otherwise weakening the lens to an extent which would cause it to be easily broken.

It is also desirable to provide a structural formation which is extremely small as well as efficient in order that it will not encroach upon the field of vision, and which will be effective to snugly compress the cement, used for securing the lens, to securely lock the parts in assembled relation without exerting undue pressure on the lens.

Further objects will be apparent from the specification and the appended claim.

In the drawing, Figure 1 is a rear elevation of one embodiment of my invention in cooperative relation with an ordinary rimless eye-glass lens.

Fig. 2 is a detailed sectional view taken on a line substantially corresponding to line 2—2 of Fig. 1;

Fig. 3 is a sectional view illustrating my invention as applied to a curved lens;

Fig. 4 is an elevation of an embodiment of my invention in which a somewhat modified form of locking means is used;

Fig. 5 is a sectional view taken on a line corresponding to line 5—5 of Fig. 4, and illustrates the modified locking means in detail;

Fig. 6 is a detailed sectional view in another modified form;

Fig. 7 is a plan view of another embodiment of my invention; and

Fig. 8 is an enlarged detail section taken on a line corresponding to line 8—8 of Fig. 7.

Referring to the drawing in detail, the embodiment illustrated comprises a strap or yoke 1 in the form of a U-shaped clip, secured to a bridge 2, and comprising an end wall 3 conforming to the contour of the edge of the lens and having lens-embracing flanges or clip arms 4 and 5, arranged to receive the edge of a lens 6 therebetween. The yoke 1 is arranged to snugly engage the lens when it is placed therein but to allow the easy insertion in and removal therefrom. A screw 7 is mounted in the flange 4 in alignment with a depression 8 in one side of the lens. The screw 7 is of such length that when it is screwed snugly against the flange 4, the end of the screw will extend a short distance through the flange and adjacent the bottom of a depression 8 which has been previously formed in the lens 6. The depression is comparatively shallow in order that the lens may not be materially weakened and is preferably a shouldered depression somewhat larger in diameter than the screw 7.

In practicing my invention, the parts are heated and cement is applied thereto, the depression 8 being also filled with cement, the lens is then inserted in the yoke 1 with the depression 8 in alignment with the screw 7. The screw is tightened against the flange 4 and extending into the depression 8 thereby forcing the cement from the depression snugly into the threads of the screw and compressing it between the clip arm 4, the shoulders of the depression, and the screw extending therein. The cement then hardens securely locking all of the parts in assembled relation. The depression 8 is accurately made to a depth corresponding to the length of the screw extending therein, and there is no appreciable pressure of the screw against the lens. The cement forms a somewhat resilient locking and securing means between the screw and the shoulders of the depression as well as between the lens and other adjacent parts of the mount.

By the above described means and method I am able to mount eye-glass lens in such a manner as to withstand greater strains in all directions without breaking the lens or loosening the mount, than has previously been possible by any commonly practiced method. In practice the dimensions of the yoke 1 are such as to provide a sliding fit on the lens, whereby the latter may be easily inserted. However, for purposes of illustration the allowable clearance space has been greatly enlarged in the drawing. The clearance is such that the cement does not "flow" to any appreciable extent during the locking operation but is snugly compressed around the screw.

In the modified form shown in Figs. 4 and 5, I provide a loosely mounted member 9 in the form of a rivet which is used in place of the screw 7, and is loosely mounted in the flange 4. The member 9 is provided with a head 10 arranged to engage in the depression 8, the flange 4 being formed with a cavity 11 therein to receive the head of the member 9 when it is raised out of engagement with the depression 8. In assembling, the member 9 is raised, as shown by dotted lines in Fig. 5, and the parts are heated, cement is then applied, and they are assembled in the same manner as previously described. The member 9 is then pushed downwardly into the depression 8 to compress the cement snugly around the rivet head and the parts are held in that position until the cement is dry.

In the form shown in Fig. 6, an outwardly extending spring 12 is secured to the wall 3 of the yoke 1 and is formed to engage in the depression 8 when the lens is inserted in the yoke. With this construction, it is only necessary to push the lens into the yoke after cementing, as illustrated, when the engaging portion of the spring 12 will snap into the depression and the hardening of the cement will hold the parts in assembled relation.

In the embodiment shown in Figs. 7 and 8, the yoke 1 is similar to that previously described, except that the flange 4 is provided with spaced openings 13 and 14 therethrough, the material between the holes being cut away to form a fulcrum 15 for a locking lever 16 pivoted thereon, and to allow the lever to lie flush with the surface of the flange when in the locked position.

When it is desired to mount the lens the lever 16 is raised to the position shown by dotted lines, whereby the end 17 of the lever will be moved downwardly into a position to be engaged by the lens when it is inserted between the flanges. Cement is then applied as previously described and the lens inserted. During this operation the end 17 of the lever is forced upwardly against the flange 4 and the downwardly extending lug 18 will be moved downwardly into the depression 8 and compressing the cement therein snugly around the lug 18. The lever will be securely locked in place by the cement between the parts.

This construction provides a desirable automatic locking means which may be released by heating the parts to soften the cement.

Having thus described my invention what I claim and desire to secure by Letters Patent is:

A lens mount comprising a U-shaped clip for engaging around the edge of a lens having a depression therein to hold a substantial amount of cement, and movable means cooperating with said depression and arranged to compress cement applied therein for locking cooperation between all of the parts, and means to prevent the impingement of said movable means against said lens.

In witness whereof, I have hereunto subscribed my name.

WILLIAM R. UHLEMANN.